June 10, 1958  J. L. SAUNDERSON ET AL  2,837,959
AUTOMATIC MEANS FOR ALIGNING SPECTROSCOPIC COMPONENTS
Filed Feb. 17, 1955  8 Sheets-Sheet 1

INVENTORS
BY Jason L. Saunderson
Eliot DuBois
ATTORNEY

June 10, 1958  J. L. SAUNDERSON ET AL  2,837,959
AUTOMATIC MEANS FOR ALIGNING SPECTROSCOPIC COMPONENTS
Filed Feb. 17, 1955  8 Sheets-Sheet 5

FIG. 7

INVENTORS
BY Jason L. Saunderson
Eliot DuBois
W.H. Hamilton
ATTORNEY

FIG. 8

June 10, 1958    J. L. SAUNDERSON ET AL    2,837,959
AUTOMATIC MEANS FOR ALIGNING SPECTROSCOPIC COMPONENTS
Filed Feb. 17, 1955          8 Sheets-Sheet 7

INVENTORS
BY Jason L. Saunderson
Eliot DuBois
ATTORNEY

United States Patent Office 2,837,959
Patented June 10, 1958

2,837,959

AUTOMATIC MEANS FOR ALIGNING SPECTROSCOPIC COMPONENTS

Jason L. Saunderson, Lexington, and Eliot Du Bois, Lincoln, Mass., assignors to Baird-Atomic, Inc., Cambridge, Mass., a corporation of Massachusetts Application February 17, 1955, Serial No. 488,786

17 Claims. (Cl. 88—14)

This invention relates, in general, to spectrochemical analysis of materials and is concerned especially with a spectrum line light rectifying method and apparatus for use with a spectrometer of the direct reading type, such as has been described in earlier patents, Nos. 2,577,-814, 2,577,815 and 2,647,236. The term "light" as employed herein is intended to signify radiant energy of any wavelength appropriate for emission spectroscopy.

In a spectrometer of the direct reading type described in the noted patents, spectrum line light is measured photoelectrically to observe the presence of constituent elements in an electrically excited sample. In thus carrying out a spectrum analysis of a sample, spectrum lines produced from the excited sample are caused to pass between "knife edges" slightly spaced apart to define apertures commonly referred to as "exit slits." It is highly essential that each of the spectrum lines coincide and fall in true alignment with their respective exit slits in order that substantially all of the light intensity for any one of the lines may be observed by a detector such as a photomultiplier tube, for example. Should a part of the light of any one of the lines become blocked out, as a result of that spectrum line impinging on one of the knife edges defining the exit slit, a serious inaccuracy will develop in the analysis. It is found that quite frequently the optical components of a spectrometer, when in use, may undergo slight changes in position and the spectrum lines then become partially blocked because of incorrectly centered positions in their respective exit slits. This necessitates troublesome and time-consuming adjustments of one or more of the optical components of the apparatus.

It is an object of the invention to provide an apparatus for rectifying the path of travel of spectrum line light which passes through exit slits and, generally, to improve spectrometers of the direct reading type. Specifically, it is an object to devise spectrum line light rectifying means which may be combined with standard spectrometer components to deal with the above-indicated problem of maintaining spectrum lines in centered relationship with respect to exit slits.

It is a further object of the invention to provide means for automatically aligning spectrum lines with their exit slits so that delicate hand adjustments are eliminated. Still another object is to provide an automatic rectifying technique which, although not in effect during the interval when a metal sample is electrically excited may, however, be maintained constantly in operation at all other times.

We have determined that the foregoing objectives may be achieved in a highly accurate and rapid manner by making use of a differential light attenuating procedure. Essentially, this technique is based on the novel concept of passing spectrum line light through a differential light attenuating device and producing spectrum line light components which induce electrical signals of opposite phase and which signals vary in accordance with any change of position of optical elements in a direct reading type spectrometer. The electrical signals produced in this manner are combined with special electrochemical means for moving the spectrum line light and some related optical element so that balancing of light components and consequently electrical signals of opposite phase is accomplished, thus providing a continuous compensation for any unwanted change in position of optical elements and proper realignment of spectrum line light.

As one suitable means for causing spectrum line light to undergo differential light attenuation as noted, we have devised a special differential light attenuating structure which includes two separated apertures defined by two pairs of knife edges, located one above another so as to transmit two separate beams of light, and so arranged as to vary the ratio of intensity of light from the two beams as the position of the beams and their respective apertures are varied relative to one another.

The knife edge pairs are, in accordance with the invention, associated with the conventional exit slit structure of a spectrometer of direct reading type so that the knife edge pairs may receive spectrum lines from the grating of the spectrometer and so that any misalignment between the standard exit slits and the other optical components of the spectrometer will also be present with respect to the knife edge pairs. Thus, a correction in positioning the two knife edge pairs will necessarily result in a correction of the associated exit slits.

Further details of construction of preferred embodiments of the invention selected for purposes of illustration are shown in the accompanying drawings, in which.

Considering the structure shown in these figures more in detail, attention is directed to Figs. 1–7 in which is illustrated conventional components of a direct reading spectrometer. With these conventional components, there has been further shown in combination a preferred embodiment of novel spectrum line light rectifying apparatus of the invention. Both conventional structure and apparatus of the invention is required to be received in some suitable casing, such as is comprised by the elongated housing 2, shown in the drawings. This housing is also provided with a removable cover section 4.

Figure 4:
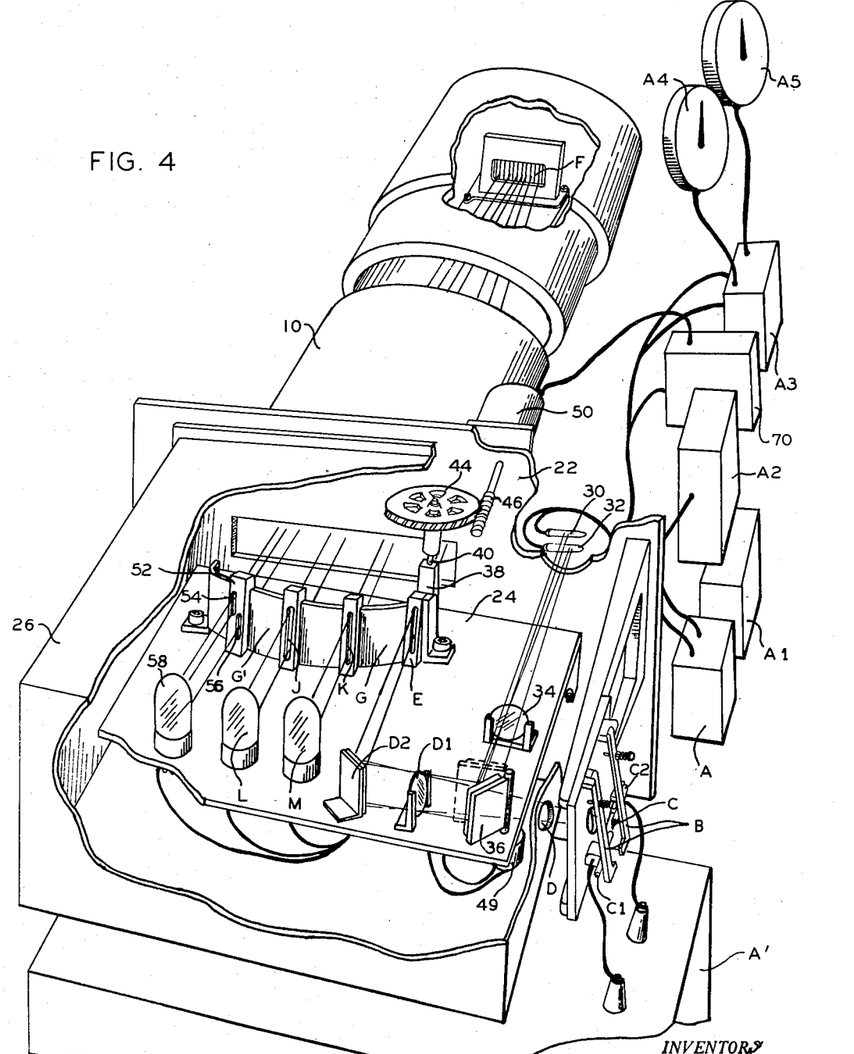
Fig. 4 is an enlarged perspective view of the spectrometer components with portions of the housing having been removed and indicating somewhat schematically electrical components connected to related elements of the spectrometer and particularly illustrating the rectifying apparatus of the invention mounted in an operation position.

Conventional spectrometer components which are contained within the housing body 2 include a spectrographic excitation source and a sample holder unit in which is supported a sample for emitting light; optical elements for separating the light into spectrum lines; and electrical measuring means for evaluating the spectrum lines. Since some of these conventional components are necessary in carrying out the method of light rectifying of the invention, such components will be separately noted and reference characters applied to them. In Fig. 4, A and A1 denote power supply units, A2 indicates an electrical timing unit and A3 refers to an electrical measuring device. These components are provided with indicator dials, two of which, A4 and A5, are shown in Fig. 4, and others are indicated generally in Fig. 1.

Considering briefly the operation of this conventional structure, a sample holder unit B is connected to the spectrographic source excitation unit and is suitably supported on a base member. By means of this arrangement, an electrical discharge may be produced at an analytical gap C formed for example, by the pins C1 and C2 of a sample to be analyzed. In a conventional type of operation, light from the gap C passes through a window D, and a lens D1, and is then reflected by a mirror D2 through an entrance slit E to fall upon a grating F.

At the grating, the reflected light is diffracted and spectrum line images are caused to fall on a focal curve piece G. Spectrum lines of a desired analysis as H and I (Fig. 7) are received through exit slits J and K supported on the focal curve piece G and then fall upon respective photomultiplier tubes L and M. These tubes produce photo-currents proportional to the light falling upon them and the currents are delivered to the electrical measuring device A3. The cycle of operation is under the control of a push-button switch P and the timer A2. For a more detailed description of the above conventional parts and their operation, reference may be had to the patents above noted.

As pointed out at an earlier point in the specification, working conditions may cause a change in position of any one of the optical elements noted, including the entrance slits E, the grating F, or the exit slits J and K, and this may cause the spectrum lines H and I to impinge upon their exit slits and thereby produce inaccuracies.

In accordance with the invention, we provide means of spectrum light rectification in which any sample spectrum line misalignment caused by changing position of these optical elements is corrected. This is accomplished, as briefly outlined at an earlier point in the specification, by passing light from an independent source against the reflector D2 and then to entrance slit E. Light from that slit E falls on the grating F and out through a differential light attenuating device consisting of the special offset knife edge pairs earlier referred to and, finally, to photomultiplier tube means. Electrical signals from the photomultiplier tube means are employed to energize a separate servo amplifier and motor and move an optical deflector plate into a position which corrects for misalignment. It will be apparent, therefore, that our method involves the use of several new light rectifying components in combination with the conventional grating F and some of its associated optical elements to produce the desired spectrum light rectification of the invention.

Considering these rectifying components of the invention and their arrangement in combination with the grating F, reference is had first to Figs. 1, 4, 5 and 6. As shown in these figures, we provide in one preferred form of apparatus a rigid tubular member 10 for receiving and shielding the grating F and providing a relatively long shielded path along which light may travel in coming toward and leaving the grating member.

Figures 1, 2, 3:
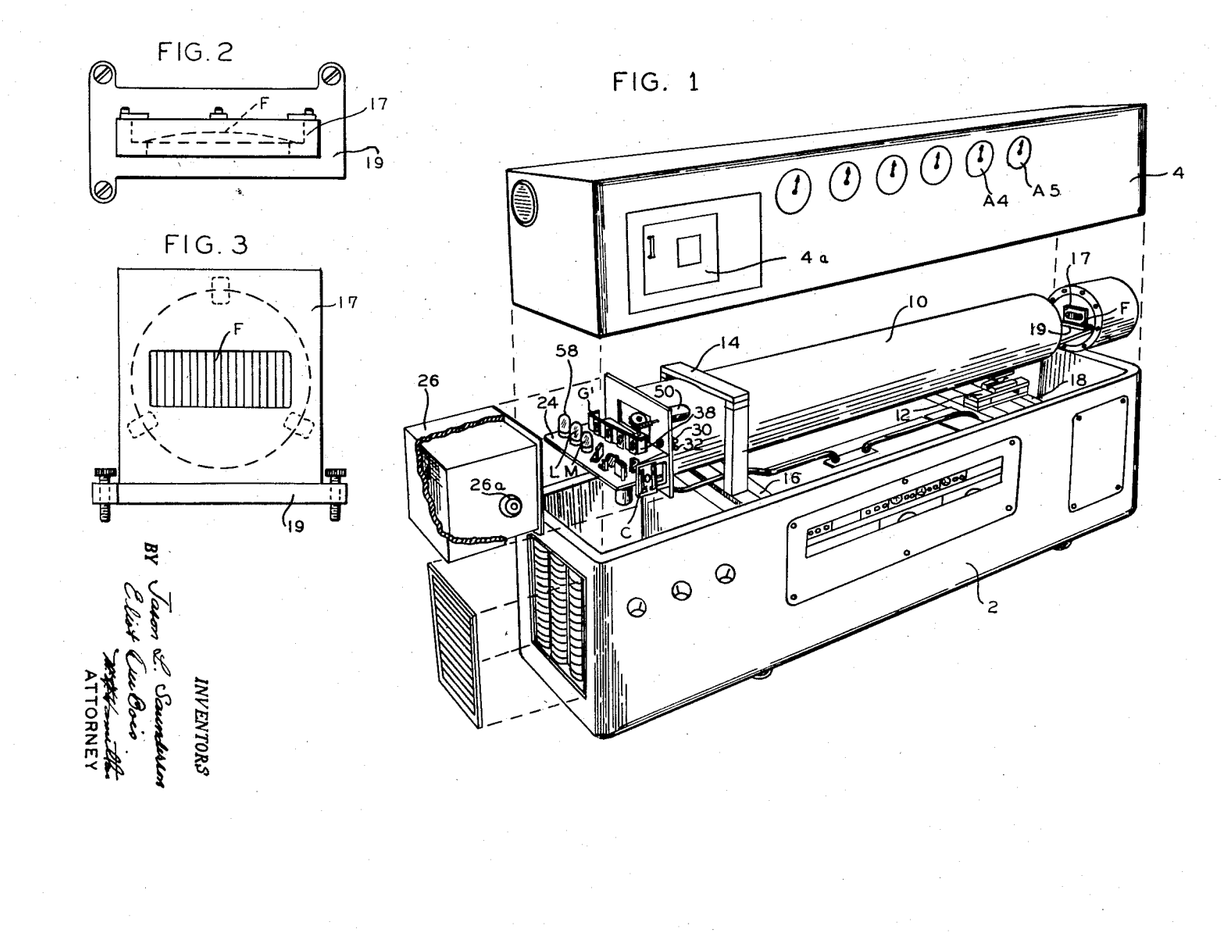
Fig. 1 is an exploded perspective view illustrating one preferred embodiment of a spectrometer in which is mounted the rectifying device of the invention.
Fig. 2 is a detail plan view of a grating mount and grating element supported thereon as employed in the apparatus shown in Fig. 1.
Fig. 3 is a front elevational view of the structure shown in Fig. 2.

This tubular member 10, as shown in Fig. 1, is supported on a shock resistant mounting 12 at one end and in a cushioned frame 14 at the other end. The frame and mounting are supported on cross pieces 16 and 18, as illustrated. For use at one end of this tubular member, we may employ a grating mount such as that shown in detail in Figs. 2 and 3, including a vertical supporting panel 17 and a horizontal portion 19 for receiving the panel.

Figure 5:
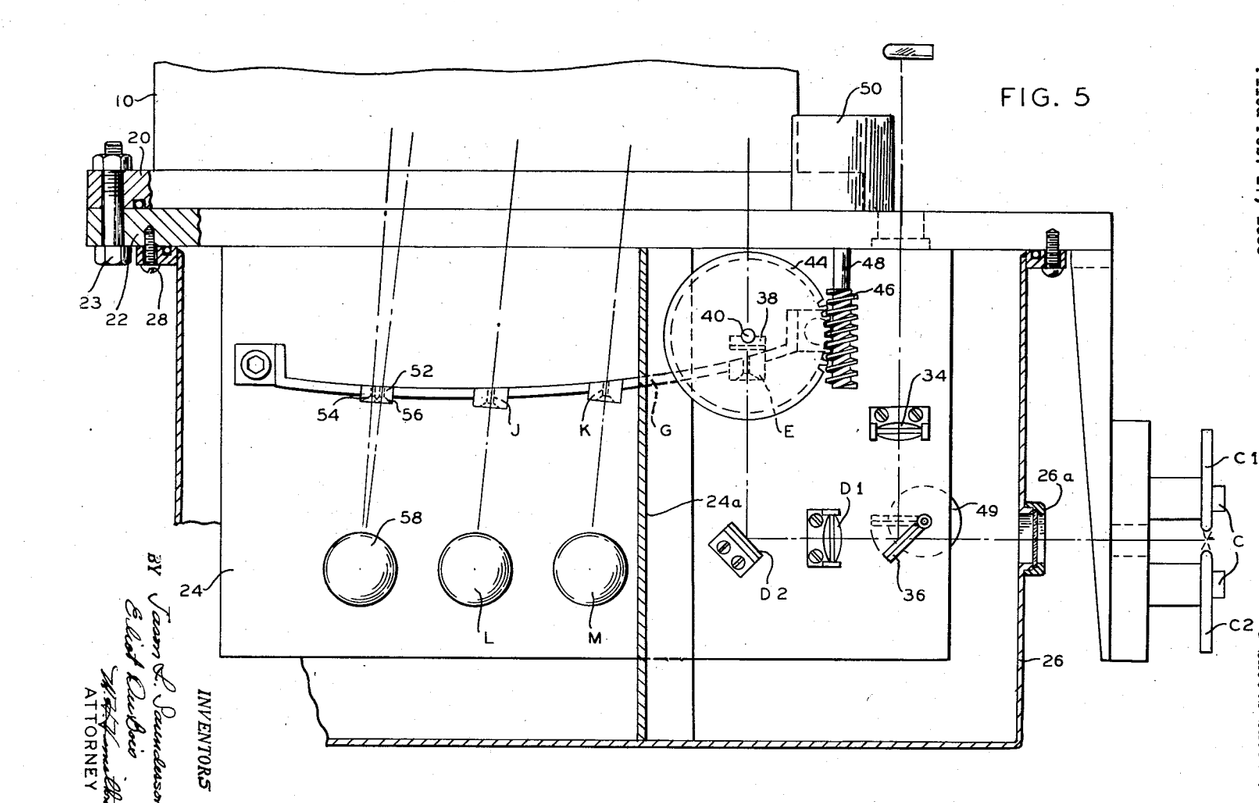
Fig. 5 is an enlarged plan view showing the front portion of the structure illustrated in Fig. 4 and further illustrating the rectifying components of the invention mounted in association with conventional spectrometer structure.

At its opposite end, the tubular member 10 is provided with a flange portion 20, shown in Fig. 5, to which is secured a vertical closure plate 22 by means of bolts 23. Rigidly clamped to this vertical plate 22, as shown in Fig. 5, is an assembly base 24. Numeral 26 denotes an enclosure cap for snugly fitting around the assembly base and vertical plate 22 so that it may be tightly secured by means of fastening members as 28.

By means of the arrangement described, it will be evident that the entire optical system can be protected from all outside conditions and the delicate light measuring units are maintained free from dirt and other troublesome factors. Although the member 10 and cap 26 substantially enclose the apparatus described, it will be observed that the conventional main housing cover section 4 in Fig. 1 is provided with a sliding shutter 4a which may be drawn back to provide access to the analytical gap C formed by the pins C1 and C2, as may also be seen from an inspection of Fig. 5. Further, it will be noted that the enclosure cap 26 is provided with a window 26a through which light from an electrical discharge at the gap C may pass through the member 26.

Figure 7:
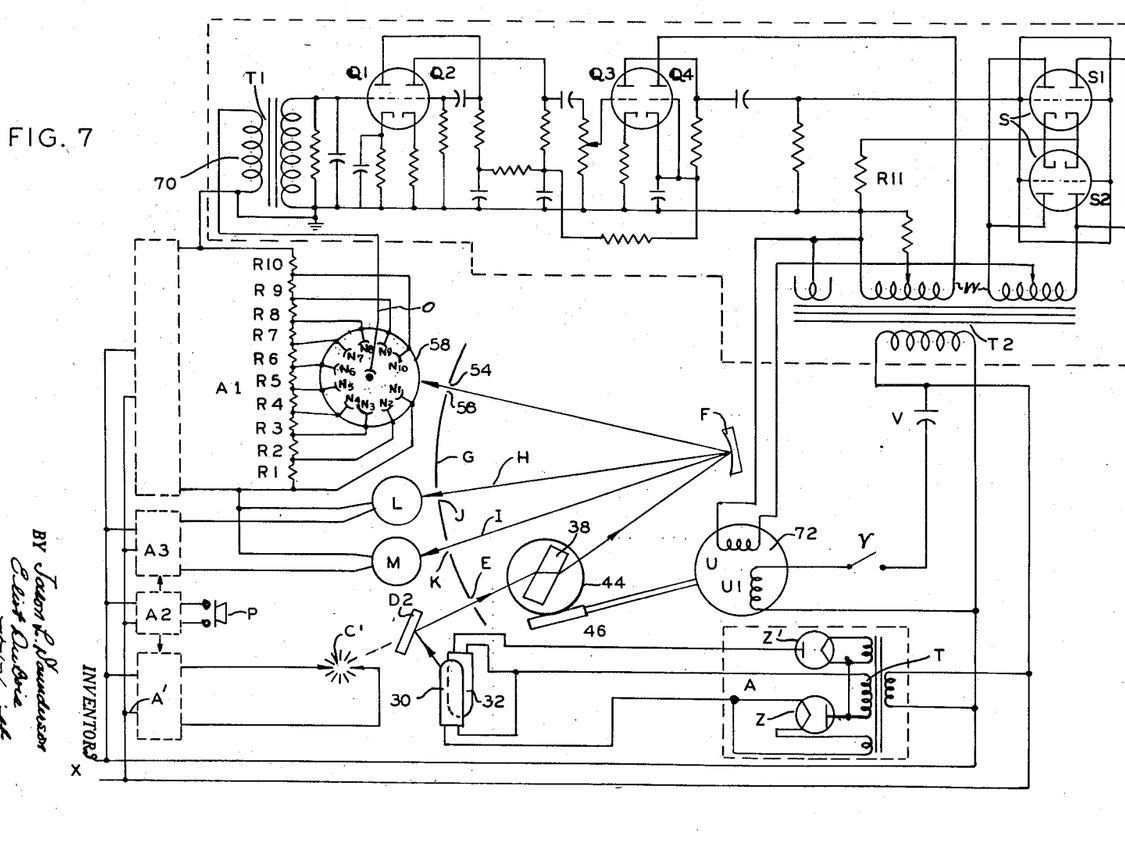
Fig. 7 is an electrical wiring diagram showing schematically the circuitry and some of the electrical components employed in carrying out the rectifying method of the invention.

Upon this vertical plate 22 and assembly base 24 construction noted, we mount an independent light source, preferably consisting of two mercury lamps 30 and 32, secured at one side of the member 22, as shown in Fig. 4. As indicated in Fig. 7, the mercury lamps are connected electrically to the secondary of a transformer T, as shown diagrammatically in Fig. 7. The lamp power supply has an alternating current input. In series with each lamp, there are rectifier tubes Z and Z' and these tubes are arranged in opposite polarity, so that an electric current will pass through one rectifier and lamp on one half cycle and through the other rectifier and lamp on the other half cycle, thus causing the upper and lower lamps to alternately produce light.

Light from these mercury lamps 30 and 32 passes through a suitable opening in member 22 and then through a lens member 34 and falls on a pivoted mirror 36 which, in the position illustrated in Fig. 4, is adjusted to reflect the two beams of light from the tubes 30 and 32 through a lens member D1 and against the mirror D2. Both mirror members 36 and D2 are conveniently mounted on the assembly base 24 in a position such as that shown in Figs. 4 and 5. From the mirror D2, the alternate beams are reflected through the entrance slit E, pass through an optical deflector plate 38 and fall on the grating F. The latter member disperses light from the alternate beams and focuses spectrum line light on the focal curve piece G.

The lens member 34, previously noted, is of an appropriate focal length so that, in combination with the lens member D2, the entrance slit E, and the grating G, it causes the light from the upper mercury lamp 30 to be dispersed and form spectra on the upper half of the focal curve piece. Each spectrum line, it should be noted, is less than half the height of spectrum lines formed at the focal curve piece by light which, during analysis, originates at the analytical light source C. In a like manner, the light from the lower lamp 32 forms spectra on the lower half of the focal curve piece. In this way, there is focused at the focal curve two spectrum lines formed by two beams, the upper beam coming from the upper mercury lamp 30 and the lower beam coming from the lower mercury lamp 32.

Figure 6:
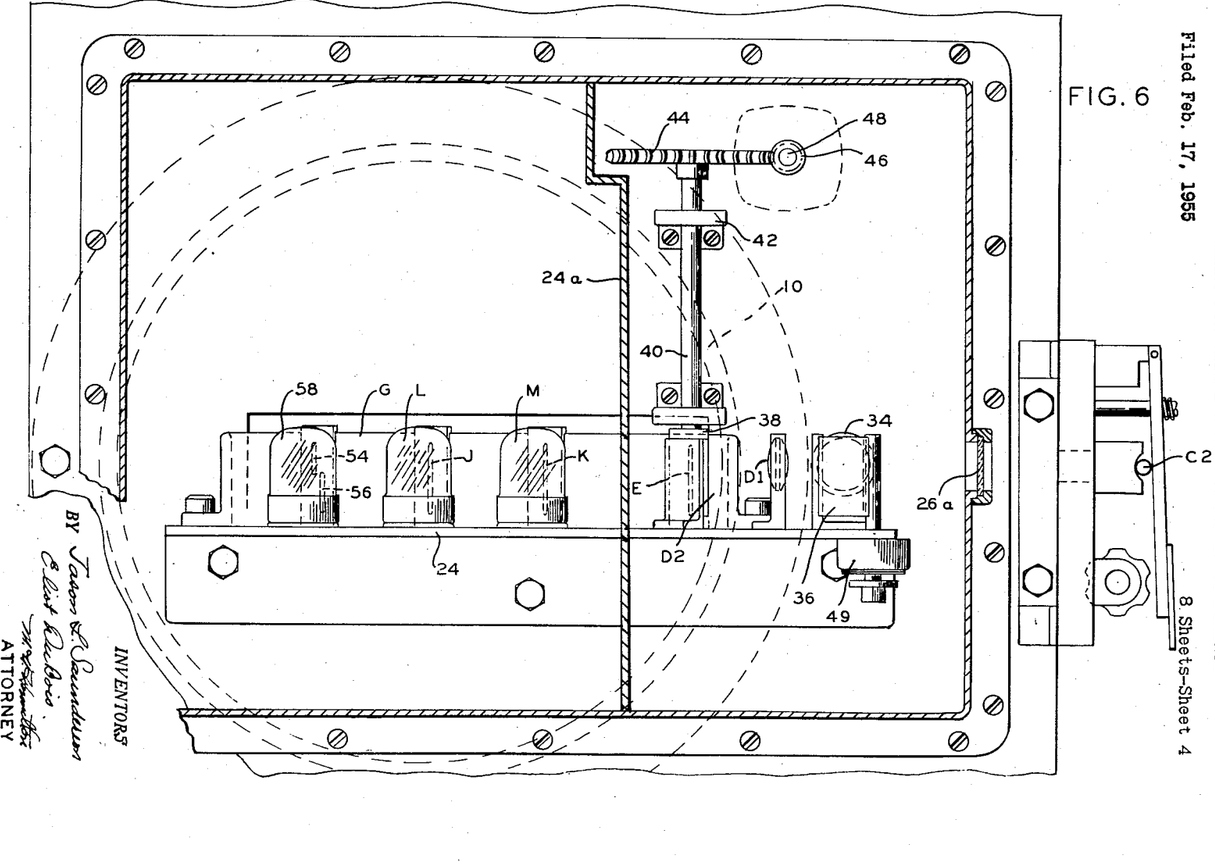
Fig. 6 is a view in end elevation of the structure shown in Figs. 1, 4 and 5 further illustrating the rectifying components and the protective housing details of construction.

The deflector plate member 38 referred to may consist of a quartz plate with two parallel faces which have the property of providing apparent displacement of the entrance slit E as a function of angular position of the plate. This deflector plate 38 is fixed to a shaft 40 at the lower end thereof, and at its upper end the shaft passes through bearing members as 42 secured to the supporting panel, as shown in Fig. 6, and has fixed at its upper extremity a worm wheel 44 in mesh with a worm 46, as noted in Figs. 5 and 6. The worm 46 is secured in turn at one end of a shaft 48 pivotally supported through the plate 22, as shown in Fig. 5, in suitable bearings therein and this shaft is driven by a servo motor 50.

In the path of the mercury spectrum line just above noted and at one side of the focal curve piece G, we mount the differential light attenuating member 52 of the invention. Member G may be formed with a slot, for example, to detachably receive the element 52. This attenuating member 52 is formed with upper and lower knife edge pairs defining offset exit slits 54 and 56 and is more clearly shown in association with the focal curve piece G in Figs. 1, 4, 5 and 6. Preferably, the member 52 is constructed of metal in substantially the form shown in the figures noted and also on a somewhat larger scale in Fig. 14.

Figures 14, 15, 16, 17:
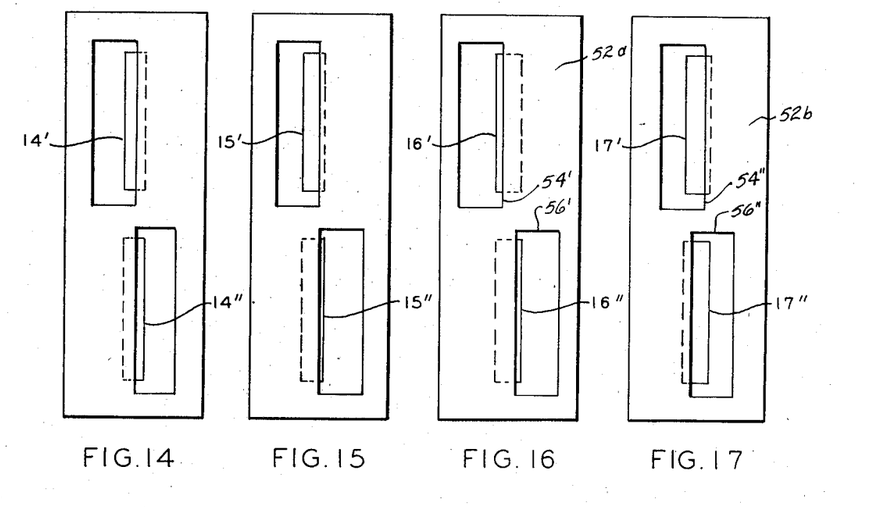
Figs. 14, 15, 16 and 17 are detail elevational views of several different forms of knife edge pairs with spectrum light from two mercury lamps illustrated diagrammatically in various arrangements in which spectrum line light rectification has been accomplished.

In the arrangement of offset slits shown in Fig. 14, it will be observed that a knife edge of one of the pairs falls along a line coinciding with a knife edge of the other of the pairs. It will be evident, therefore, that if spectrum lines of the same radiant energy are caused to assume positions such as represented by the rectangles 14' and 14" of Fig. 14, substantially equal light intensities will pass through each of the apertures 54 and 56. Likewise, it will be evident that, if the position of the differential light attenuating element changes relative to the spectrum lines, then the ratio of intensity of light from the spectrum lines varies in accordance with such changes and light rectification is required.

To receive the spectrum line light passing from these exit slits 54 and 56, we provide a photomultiplier tube 58 arranged adjacent to the focal curve piece G in a manner such as that shown in Figs. 4–6, inclusive. This member 58 is employed as a light sensing element and, when energized, produces an electrical current the instantaneous value of which is proportional to the light flux falling upon it.

Because of the alternating nature of the mercury lamp light source, spectrum line light will pass through first one slit and then the other to fall upon the photomultiplier in each case. Since the slits are offset from one another, there will be one position, as just above noted, at which the amount of light from one spectrum line will be exactly in balance with the light from the other spectrum line. At such times, the output of the photomultiplier will be identical for times corresponding to the two half cycles of the input to the mercury lamp power supply and the system may be said to be rectified for radiant energy balance.

In operation, light from the two mercury lamps passes through the entrance slit of the optical system and is received through the deflector plate 38 to thereafter fall upon the grating and become diffracted into mercury spectrum lines. Assume that the spectrum line light is in correct register with the offset slits, as suggested diagrammatically in Fig. 14. It will be understood that, for this system to be in radiant energy balance, the total amount of radial energy from one of the mercury lamps must equal the total amount of radiant energy from the other of the lamps and each spectrum line must fall upon and overlie substantially equal surface areas of the photomultiplier tube 58. As long as these conditions are in effect, the system will undergo no change; therefore, all spectrum lines may be assumed to be in correct register with their respective slits.

Assume next that in the normal use of the spectrometer an unwanted displacement of one of the optical elements takes place. Then, the light rectifying system will be thrown out of balance since the area of impingement of light from one spectrum line component varies with respect to the area of impingement of light from the other spectrum line component on the respective slits in the light attenuating member, as shown in Fig. 15 and as represented by the unequal rectangles 15' and 15". Such an unbalancing of the system will cause the photomultiplier tube 58 to operate through the electrical components above described and hereinafter set forth in greater detail. The alternating output of the photomultiplier tube produces a rotation of the motor shaft with the direction of rotation being dependent on the phase of the photomultiplier output. The motor shaft causes the deflector plate to rotate to some new position so that light from the mercury lamps strikes the deflector plate at some angle between 0° and 90° and is displaced laterally an amount dependent on the angle of rotation of the deflector plate from the normal. Rotation of the deflector plate rectifies the spectrum line light of the mercury lamps to provide for radiant energy alternately passing through the slits 54 and 56 and again arriving in balanced amounts at the photomultiplier, as shown in Fig. 14. As a displacement of spectrum line light from the mercury lamps, obtained by moving the deflector plate, also causes an apparent displacement of the entrance slit E, the positions of all sample spectrum lines which necessarily pass through the deflector plate to reach the grating are displaced a like amount and the entire system is rectified.

Figure 15 may also be considered to be illustrative of another balanced arrangement. It will be appreciated that if one spectrum line component has greater radiant energy than the other spectrum line component, then a balanced condition at the photomultiplier tube 58 may be accomplished, for example, by having the width of the relatively weaker spectrum line component greater than the width of the relatively stronger component, so that equal amounts of radiant energy pass through each slit of the member 52, as suggested in Fig. 15. By suitably controlling, therefore, both the radiant energy output of the mercury lamps and the register of spectrum line components with the offset attenuating member, desirable light rectification may be carried out.

In addition to the slit arrangement illustrated in Fig. 14, we may employ other modified forms of offset slits. In Fig. 16, there is illustrated another arrangement of knife edge pairs 52a having apertures 54' and 56' which are spaced from one another slightly. In Fig. 17, there is illustrated a knife edge pair 52b having overlapping apertures 54″ and 56″. Each of these knife edge pieces are capable of varying the ratio of intensity of light from a spectrum line or lines.

It should also be understood that, in place of the grating F, we may utilize an optical prism or other light dispersing devices in carrying out the method of the invention. Similarly, there may be employed in place of photomultipliers various other detector devices known to the art.

The operation of the electrical circuits shown in Fig. 7 is as follows. A power source alternating current X supplies the conventional spectrometer components A′, A1, A2 and A3, previously noted, as well as the rectifying components described below.

The lamp power supply A which receives its electrical power input from power source X provides current on opposite phases to the two lamps 30 and 32. The lamp power supply A preferably includes a transformer T, the primary of which is connected to the power source X. The secondary of transformer T is connected to the two lamps. The lamps are in parallel across the secondary of the transformer but with the rectifier tube Z connected in series with lamp 30 in one polarity, and the rectifier tube Z′ connected in series in the opposite polarity with the lamp 32. Thus, the lamps are caused to produce light alternately corresponding to the opposite phases of the alternating current of the power source X.

Light from these lamps, following a correction previously described, arrives at a light detector means 58 which is preferably a photomultiplier tube. The power supply A1, which, for purposes of spectrochemical analysis, supplies voltage to the photomultipliers L and M, also supplies voltage to the dynodes N1 through N10 of the photomultiplier tube means 58 by means of the resistor divider R1 through R10. The photomultiplier collector anode or output O is connected to the input of the amplifier, preferably including an input transformer T1, three stages of voltage amplification Q1, Q2 and Q3, output motor driving stage S, and an output transformer T2. This amplifier is conventional and also contains resistors and condensers appropriate to the proper function of the amplification and motor driving stages noted above. The tube half Q4 serves as a rectifier for the power supply of the amplifier.

If there is a displacement of the mercury spectrum lines falling upon the differential light attenuating means defined by the offset slits 54 and 56, there will be a consequent unbalance of the light components falling upon the photomultiplier tube means 58. Consequently, at the output O of the photomultiplier tube, there will be an alternating current signal of the same frequency as the power source X, the phase of the signal being determined by the direction of displacement of the spectrum line. This alternating current signal will be impressed upon the primary of the transformer T1 in the phase-sensitive servo amplifier 70 and will be amplified in the three stages, Q1, Q2 and Q3 of voltage amplification and impressed upon the grids of the tubes S1 and S2 in the output or motor driving stage S. It will be noted that the left halves of the tubes S1 and S2 are connected to the left tap of a winding W of the transformer T2 and the right halves of the tubes S1 and S2 are connected to the right tap of the same winding. The center tap of this winding connects through a winding U in the servomotor 72 through a resistor R11 to the cathodes of the tubes S1 and S2. The primary of the transformer T2 is connected to the alternating power source X.

From this, it will be appreciated that, during one-half cycle of the power input X, the left halves of the tubes S1 and S2 will be able to conduct and that during the other half cycle the right halves will be able to conduct. It will be further appreciated that, if an alternating signal of the same frequency is present at the grids of the tubes S1 and S2, then the conduction of one side of the tubes will be increased and the conduction of the other side decreased, and the result will be pulsing current through the winding U, and that the phase of this pulsing current will be determined by the phase of the alternating signal on the grid of the tubes S1 and S2. As the other winding U1 of the servomotor 72 is connected through a capacitor V to the same source of electrical supply X, which establishes the phase relationship of the lamp power supply A to the amplifier 70, the phase of the pulse in the winding U will determine the rotation of the shaft 46. The rotation of this shaft corrects the unbalance previously mentioned. The switch Y turns off the servomotor 72 during the period of sample analysis.

It will be understood that light rectification should be carried out prior to the actual analysis of samples and it is not intended that the light rectifying apparatus be in operation when sample light is passing from the analytical gap. When the instrument is used for analysis, the mirror 36 may be swung into the dotted line position shown in Fig. 5, thus preventing mercury rectifying light from entering the entrance slit, and at the same time allowing sample light to enter the entrance slit. This may be carried out either manually or electromechanically by a solenoid control mechanism 49.

If desired, the servomotor 72 may also be disconnected at the same time by switch Y. It is pointed out that at all times, other than when samples are being analyzed, the rectifying system can be sustained in effect and, therefore, the optical system is constantly rectified and ready for use at all times. In order to prevent light from either the mercury lamps or an excited sample from reaching the photomultiplier tubes without going through the entrance slit, we may further provide a light excluding panel 24a mounted on the assembly base 24 in the manner suggested in Figs. 5 and 6.

Figure 8:
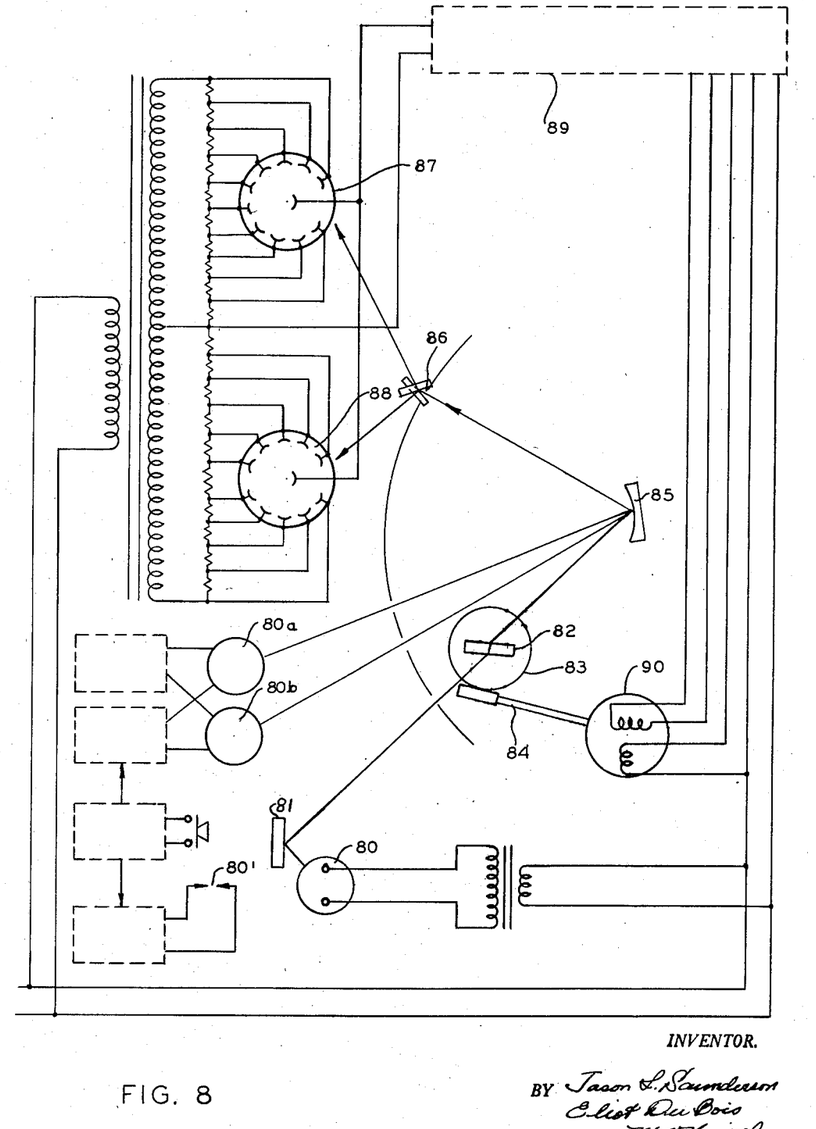
Fig. 8 is another wiring diagram illustrating schematically a modified form of apparatus of the invention in which two photomultiplier tubes are employed.

The method and apparatus of the invention, as above described, embodies essentially the principle of using two out-of-phase light sources falling on a single detector. However, we may also carry out the method by using an alternate arrangement in which light from one source, i. e., one lamp, is differentially attenuated and allowed to fall on two out-of-phase photomultipliers, for example, and such an arrangement of components has been illustrated in Fig. 8. In this case, light from a source 80 is reflected, as suggested diagrammatically in Fig. 8, from a mirror 81 to an entrance slit not shown then to a deflector plate 82 controlled by a worm wheel 83 and worm 84 of the type described. A grating 85 diffracts light from the source 80 as well as gap 80′. Spectrum line light of samples are received on photomultipliers 80a and 80b. Spectrum line light from 80 is passed through slit 86 in a light differentiating member of the same construction as that already described, as shown diagrammatically in Fig. 18. Light from the top slit represented by the rectangle 18′ (Fig. 18) is received upon a photomultiplier tube 87, and light from the bottom slit represented by rectangle 18″ (Fig. 18) is caused to fall upon a second photomultiplier tube 88, as suggested in Fig. 8. One of these photomultipliers is arranged to be sensitive to electrical signals on one-half cycle and the other photomultiplier is sensitive on the opposite half cycle. The outputs of these two tubes are fed into a servo amplifier 89 which, in turn, powers a servomotor 90. The motor operates to turn the deflector plate 82 into a position of correction at which the electrical signals are in balance and spectrum line light is rectified with its slit. Power supply units are shown at the lower left-hand side of Fig. 8 and are similar to those already described.

Figures 18, 19, 20, 21:
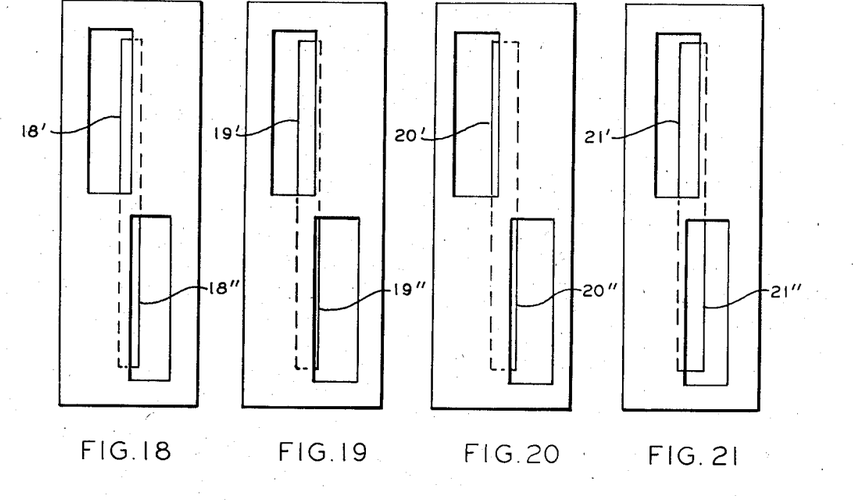
Figs. 18–21, inclusive, are views similar to Figs. 14–17 but further illustrating spectrum light rectification accomplished where a single mercury lamp is employed as rectifying light source.

As shown in Fig. 18, a knife edge of each pair may be in alignment. However, we may employ the arrangements of Fig. 20 and Fig. 21 in which the spectrum lines represented by rectangles 20′, 20″ and 21′ and 21″ are either spaced from one another or located in overlapping relation, as shown. Similarly, as noted in Fig. 19, balancing control of register may be resorted to for one mercury lamp, as suggested in Fig. 19, by the unequal rectangles 19' and 19", by varying the relative sensitivity of the two out-of-phase photomultipliers.

The invention, as now disclosed, is based on a rectifying operation involving control of a deflector plate 38. However, the invention is not limited to use of this deflector plate and, in Figs. 9–13, inclusive, various other arrangements are shown for effecting a correction of spectrum line register.

Figures 9, 10, 11, 12, 13:
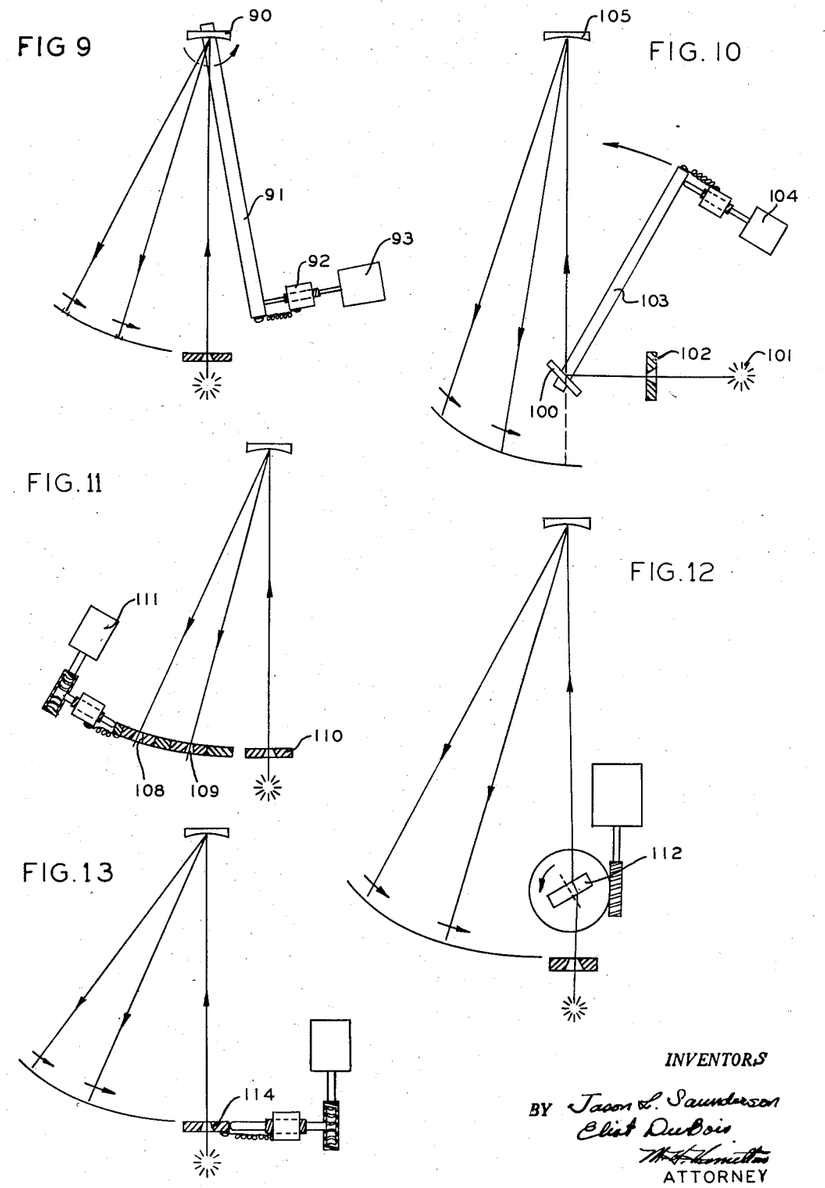
Fig. 9 is a diagrammatic view illustrating another means of producing relative movement of spectrum lines by varying the position of a grating member.
Fig. 10 is a diagrammatic view similar to Fig. 9 but illustrating means for varying the relative position of spectrum lines by varying the position of a mirror to make the entrance slits appear to move.
Fig. 11 is a diagrammatic view similar to Figs. 9 and 10 but illustrating a means for positioning spectrum lines by moving the exit slits.
Fig. 12 is another diagrammatic view illustrating a means of positioning spectrum lines by moving a deflector plate.
Fig. 13 is still another diagrammatic view illustrating means for moving the entrance slit.

In Fig. 9, we have illustrated diagrammatically a method of light rectifying in which a grating 90 is rotated through an arm 91 resiliently anchored to a worm member 92 driven by a servomotor 93. The servomotor may be powered in the manner already described in detail, using either a single multiplier tube or two multiplier tubes which receive light from the light differentiating member of the invention.

Figure 10 shows an arrangement for moving spectrum lines by making the entrance slit appear to move through rotation of a mirror 100 which receives light from a source 101 and a slit 102. A spring-held arm 103 is adjusted through a servomotor 104 to change the apparent position of the entrance slit as observed from the grating, which changes the position of the spectrum lines coming from the grating.

In Fig. 11, there is shown an arrangement for moving exit slits 108 and 109 and their focal curve piece 110 by means of a servomotor 111 of the character described. Similarly, Figs. 12 and 13 show means for moving a deflector plate 112, as already described in connection with Fig. 7, and also means for moving an entrance slit 114 using the same servomotor mechanism.

It is further intended that various other changes and modifications may be resorted to within the scope of the invention as defined by the appended claims.

We claim:

1. In a spectrometer of the direct reading type having a light dispersing member for dispersing light into sample spectrum lines, exit slits through which the sample lines are passed, and electrical means for measuring the radiant energy of said spectrum lines, the combination of adjustable optical means for changing the path of travel of said light, an independent light source arranged to emit light and, in conjunction with the said adjustable optical means, to pass independently produced light to the light dispersing member, a differential light attenuating element including two knife-edge pairs arranged along the focal curve of the light dispersing member to receive spectrum line light dispersed from the independent light source by the light dispersing member, electrical measuring means for alternately evaluating the radiant energy passing through the knife-edge pairs, and electromechanical means responsive to the said electrical measuring means for varying the position of the said adjustable optical means in accordance with a change in position of the spectrum line light from the independent light source with respect to the said knife-edge pairs.

2. A structure as defined in claim 1 in which the adjustable optical means comprises a light deflecting element.

3. A structure as defined in claim 1 in which the adjustable optical means comprises means for moving the said entrance slits.

4. A structure as defined in claim 1 in which the adjustable optical means comprises means for moving the said light dispersing member.

5. A structure as defined in claim 1 in which the adjustable optical means comprises means for moving the said exit slits.

6. A structure as defined in claim 1 in which the said spectrometer includes entrance slits and the said adjustable optical means comprises means for moving the said entrance slits.

7. A structure as defined in claim 1 in which the said spectrometer is provided with a mirror for positioning the path of travel of light to the light diffusing member, and said adjustable optical member includes means for changing the position of said mirror.

8. Spectroscopic apparatus comprising first means for exciting a chemical sample to emit characteristic radiation, second means for directing said characteristic radiation along a predetermined optical path, third means for dispersing said characteristic radiation from said optical path into a spectrum, fourth means for reading said spectrum, fifth means for emitting monitor radiation, sixth means for directing said monitor radiation along said optical path to said third means, and seventh means responsive to said monitor radiation from said third means for controlling the relative orientations of said optical path, said third means and said fourth means.

9. Spectroscopic apparatus comprising a pair of electrodes for producing an electrical spark in order to excite a chemical sample to emit characteristic radiation, a first optical system for transmitting said characteristic radiation, a diffraction grating for dispersing said characteristic radiation received from said optical system into a spectrum, a source of radiation of given wave length, a second optical system for introducing said radiation of given wave length into said first optical system toward said diffraction grating, a shield providing a plurality of slits for transmitting said radiation of selected wave lengths and said radiation of given wave length from said diffraction grating, a series of photo-electric cells for discriminatively receiving said radiation of selected wave lengths and said radiation of given wave length from said slits, and an electrical system operatively connected with said photo-electric cells, said electrical system indicating the intensity distribution of said radiation of selected wave lengths and, in response to said radiation of given wave length, controlling the mechanical relationships among said first optical means, said diffraction grating and said shield.

10. A structure as defined in claim 8 in which the said fifth means for emitting monitor radiation includes two out-of-phase lamps and said seventh means comprising photo-electrical measuring means including a photomultiplier tube.

11. A structure as defined in claim 8 in which the said fifth means for emitting monitor radiation includes a lamp and said seventh means comprises photoelectrical measuring means including two out-of-phase light detectors.

12. Spectroscopic apparatus comprising excitation means for evoking characteristic radiation from a chemical sample, monitor means for emitting given radiation, entrance means for transmitting said characteristic radiation and said given radiation from said excitation means and said monitor means, spectroscopic means for diffracting said characteristic radiation and said given radiation, first exit means for transmitting said characteristic radiation from said spectroscopic means, means for measuring said characteristic radiation transmitted by said first exit means, second exit means for transmitting said given radiation, the spacial relationships between said first exit means and said second exit means being predetermined, and automatic means responsive to said given radiation transmitted by said second exit means for controlling the spacial relationships among said entrance means, said spectroscopic means, said first exit means and said second exit means.

13. Spectroscopic apparatus comprising excitation means for evoking characteristic radiation from a chemical sample, monitor means for emitting given radiation, entrance means for transmitting said characteristic radiation and said given radiation from said excitation means and said monitor means, spectroscopic means for diffracting said characteristic radiation and said given radiation, first exit means for transmitting said characteristic radiation from said spectroscopic means, means for measuring said characteristic radiation transmitted by said first exit means, second exit means providing slits for said given radiation, the spacial relationships between said first exit means and said second exit means being predetermined, comparator means responsive to the relative intensities of beams of said given radiation transmitted through said slits of said second exit means, and a servo-motor responsive to said comparator means for controlling the spacial relationships among said entrance means, said spectroscopic means, said first exit means and said second exit means.

14. Spectroscopic apparatus comprising excitation means for evoking characteristic radiation from a chemical sample, monitor means for emitting a first beam and a second beam of given radiation, entrance means for transmitting said characteristic radiation and said given radiation from said excitation means and said monitor means, spectroscopic means for diffracting said characteristic radiation and said given radiation, first exit means for transmitting said characteristic radiation from said spectroscopic means, means for measuring said characteristic radiation transmitted by said first exit means, second exit means providing a first exit slit for said first beam and a second exit slit for said second beam, the spacial relationships between said first exit means and said second exit means being predetermined, comparator means responsive to the relative intensities of said first beam transmitted through said first slit and said second beam transmitted through said second slit, and a servo-motor responsive to said comparator means for controlling the spacial relationships among said entrance means, said spectroscopic means, said first exit means and said second exit means.

15. In a direct reading spectrometer, which includes a light source of the analytical gap type, an entrance slit element located at one side of the light source, a diffracting grating arranged to receive light from the slit and disperse said light into spectrum lines, exit slit elements positioned along the focal curve of the grating to provide for passage of spectrum lines therethrough, photomultiplier tubes mounted in the path of said spectrum lines, and electrical circuits for measuring the output of the photomultiplier tubes, means for maintaining said spectrum lines in correctly registered relationship with said slits, said means including two out-of-phase light sources located in a position such that light emitted therefrom is caused to travel along the same path as light from the analytical gap, a pair of optical slits offset horizontally and arranged one above another, each of said slits being located in a position to pass part of the light from the spectrum lines emitted from the out-of-phase light sources, a photomultiplier tube mounted in a position to alternately detect respective spectrum line light components from the slits, a phase-sensitive amplifier, a motor driven by the amplifier and a mechanism connected to the motor for adjusting the position of the spectrum line light so that two portions of light from said spectrum lines passing through the said pair of optical slits are equal in intensity.

16. In a direct reading spectrometer which includes a light source of the analytical gap type, an entrance slit element located at one side of the light source, a diffracting grating arranged to receive light from the slit and disperse said light into spectrum lines, exit slit elements positioned along the focal curve of the grating to provide for passage of spectrum lines therethrough, photomultiplier tubes mounted in the path of said spectrum lines, and electrical circuits for measuring the output of the photomultiplier tubes, means for maintaining said spectrum lines in correctly registered relationship with said slits, said means including a single light source located in a position such that light emitted therefrom is caused to travel along the same path as light from the analytical gap, a pair of optical slits offset horizontally and arranged one above another, said slits being arranged to pass part of the spectrum line light from said single light source, two light-detector elements arranged so that light from one of said slits may be received at one of the detectors and light from the other of said slits may be received by the other detector, the detectors being electrically connected so that their outputs are out of phase, an out-of-phase amplifier, means for feeding the combined outputs of the detectors to the out-of-phase sensitive amplifier, a motor driven by the amplifier and a mechanism connected to the motor for adjusting the position of the spectrum lines until two portions of light from said spectrum lines passing through the said pair of optical slits are equal in intensity.

17. Spectroscopic apparatus comprising excitation means for evoking characteristic radiation from a chemical sample, monitor means for emitting given radiation, entrance means for transmitting said characteristic radiation and said given radiation from said excitation means and said monitor means, spectroscopic means for diffracting said characteristic radiation and said given radiation, first exit means for transmitting said characteristic radiation from said spectroscopic means, means for measuring said characteristic radiation transmitted by said first exit means, second exit means for said given radiation, the spatial relationships between said first exit means and said second exit means being predetermined, comparator means responsive to the relative intensities of beams of said given radiation transmitted through said slits of said second exit means, and a servo-motor responsive to said comparator means for controlling the spatial relationships among said entrance means, said spectroscopic means, said first exit means and said second exit means.

References Cited in the file of this patent

UNITED STATES PATENTS

| 2,649,013 | Schnelle | Aug. 18, 1953 |
| 2,675,734 | Hasler et al. | Apr. 20, 1954 |

FOREIGN PATENTS

| 712,114 | Great Britain | July 21, 1954 |